(12) United States Patent
Stiesdal

(10) Patent No.: US 9,018,821 B2
(45) Date of Patent: Apr. 28, 2015

(54) STATOR ARRANGEMENT FOR AN ELECTROMECHANICAL TRANSDUCER, ELECTROMECHANICAL TRANSDUCER AND WIND TURBINE

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 570 days.

(21) Appl. No.: 13/048,925

(22) Filed: Mar. 16, 2011

(65) Prior Publication Data

US 2011/0233938 A1 Sep. 29, 2011

(30) Foreign Application Priority Data

Mar. 25, 2010 (EP) .................................. 10157744

(51) Int. Cl.
| | |
|---|---|
| *H02K 1/18* | (2006.01) |
| *H02K 16/04* | (2006.01) |
| *H03D 9/00* | (2006.01) |
| *H02K 7/08* | (2006.01) |
| *H02K 16/00* | (2006.01) |
| *H02K 21/24* | (2006.01) |
| *H02K 7/18* | (2006.01) |

(52) U.S. Cl.
CPC ............... *H02K 1/182* (2013.01); *H02K 7/088* (2013.01); *H02K 16/00* (2013.01); *H02K 21/24* (2013.01); *H02K 2201/03* (2013.01); *Y02E 10/725* (2013.01); *H02K 7/1838* (2013.01)

(58) Field of Classification Search
CPC . H02K 1/182; H02K 7/1838; H02K 2201/03; Y02E 10/725

USPC ................... 310/51, 216.124, 156.32, 310/156.36–156.37, 423, 431
See application file for complete search history.

(56) References Cited

U.S. PATENT DOCUMENTS

| | | | |
|---|---|---|---|
| 3,413,503 A | 11/1968 | Parker | |
| 5,057,726 A | 10/1991 | Mole et al. | |
| 5,079,461 A * | 1/1992 | Schluter et al. | ............. 310/67 A |
| 6,002,193 A * | 12/1999 | Canini et al. | .................. 310/268 |
| 6,930,422 B2 * | 8/2005 | Rose | ......................... 310/156.32 |
| 7,825,532 B1 * | 11/2010 | Barber | ............................ 290/55 |
| 7,854,198 B2 * | 12/2010 | Groening et al. | ............. 101/216 |
| 8,198,749 B2 * | 6/2012 | Numajiri | .......................... 290/55 |
| 2002/0135244 A1 * | 9/2002 | Strong et al. | ..................... 310/51 |
| 2004/0041409 A1 * | 3/2004 | Gabrys | ............................ 290/55 |
| 2006/0178485 A1 * | 8/2006 | Shimakage et al. | ........... 525/242 |
| 2008/0024019 A1 | 1/2008 | Sakuma et al. | |

FOREIGN PATENT DOCUMENTS

| | | |
|---|---|---|
| CN | 101114779 A | 1/2008 |
| DE | 10140362 A1 | 3/2003 |
| JP | H02155452 A | 6/1990 |

(Continued)

*Primary Examiner* — Quyen Leung
*Assistant Examiner* — Eric Johnson

(57) ABSTRACT

A stator arrangement for an electromechanical transducer is provided. The stator arrangement includes a base structure, a coil holder, a coil mounted at the coil holder; and a flexible element connecting the base structure to the coil holder flexibly relative to each other. Further, an electromechanical transducer is provided that includes the above-mentioned stator arrangement and a rotor arrangement rotatable relative to the base structure around an axial direction. Still, further, a wind turbine is provided that includes the above-mentioned electromechanical transducer as a generator.

14 Claims, 3 Drawing Sheets

(56) References Cited

FOREIGN PATENT DOCUMENTS

| | | |
|---|---|---|
| JP | H0475456 A | 3/1992 |
| JP | 2004080958 A | 3/2004 |
| JP | 2008043055 A | 2/2008 |
| WO | WO 2008117631 A1 | 10/2008 |
| WO | WO 2009019562 A2 * | 2/2009 ............... H02K 3/52 |
| WO | WO 2009071843 | 6/2009 |

* cited by examiner

STATOR ARRANGEMENT FOR AN ELECTROMECHANICAL TRANSDUCER, ELECTROMECHANICAL TRANSDUCER AND WIND TURBINE

CROSS REFERENCE TO RELATED APPLICATIONS

This application claims priority of European Patent Office application No. 10157744.3 EP filed Mar. 25, 2010, which is incorporated by reference herein in its entirety.

FIELD OF INVENTION

The present invention relates to a stator arrangement for an electromechanical transducer, to an electromechanical transducer utilizing the stator, and to a wind turbine utilizing the electromechanical transducer as a generator.

ART BACKGROUND

Electromechanical transducers are machines which convert electrical energy into mechanical energy or vice versa, such as an electrical motor or a generator. While for example an electric motor converts electrical energy into mechanical energy, an electric generator converts mechanical energy into electrical energy. However, both types of electromechanical transducers use a magnetic field in conjunction with a conductor to achieve the energy conversion. In particular, a changing magnetic flux generated by the magnetic field may induce a voltage between points of the conductor resulting in a current representing electrical energy.

An electromechanical transducer may comprise a stator arrangement and a rotor arrangement. The stator arrangement may represent a stationary part of the electromechanical transducer, while the rotor arrangement may represent a part or parts of the electromechanical transducer moving relative to the stator arrangement, in particular rotating relative to the stator arrangement. The rotor arrangement thereby may comprise magnets, such as permanent magnets, which rotate relative to one or more coils comprised in the stator arrangement.

There are a number of different types of generators which differ in the direction of a major part of the magnetic field relative to a rotation axis of the rotor arrangement. In a so-called radial flux generator the magnetic field lines of the major part of the magnetic field are directed in a radial direction perpendicular to the axial direction representing the direction of the rotation axis of the rotor arrangement. In contrast, in a so-called axial flux generator the magnetic field lines of the major part of the magnetic field are at least approximately parallel to the axial direction. To achieve this direction of magnetic field lines the magnets comprised in the rotor arrangement have to be arranged appropriately. In particular, a connecting line connecting the two magnetic poles may be oriented at least approximately parallel to the axial direction.

Depending on the orientation of the magnets also the coils comprised in the stator arrangement must be arranged appropriately such that a magnetic flux penetrating through the coils is maximized. In particular, a small gap may be formed between magnets of the rotor arrangement and the coils of the stator arrangement.

An advantage of an axial flux generator may be that the magnetic flux is oriented along the axial direction of the rotor arrangement. This may substantially eliminate or reduce traditional cogging problems.

It may be important to keep the air gap between the magnets of the rotor arrangement and the coils of the stator arrangement constant so that an axial magnetic flux may be uniform for each of the magnets passing the coils of the stator arrangement. In order to maximize the efficiency of the generator the size of the air gap may be very small, such as a few millimeters. However, any misalignments and/or any movements or deflections of the rotor arrangement relative to the stator arrangement may result in alternating axial flux and may even result in damage of components of the generator. For generators having increased diameters this problem may be even more severe, as even a small misalignment of the rotation axis of the rotor arrangement may result to movements or deflections of radially outer parts which scale with the diameter such that an amount of these movements or deflections may not be tolerable or may lead to collisions of components of the rotor arrangement with components of the stator arrangement.

Document WO 2009/071843 discloses an axial flow electric rotary machine, wherein a filler material has been added in the air gap between rotating magnets and stationary coils.

However, it has been observed that conventional generators still suffer disadvantages in respect to efficiency and durability. There may be a need for a stator arrangement for an electromechanical transducer which, when used in an electromechanical transducer, improves operation of the transducer, in particular in respect to its efficiency and durability. Further, there may be a need for an electromechanical transducer which at least partly obviates problems observed in the prior art resulting from misalignments and/or deflections of the rotor arrangement relative to the stator arrangement.

SUMMARY OF THE INVENTION

According to an embodiment a stator arrangement for an electromechanical transducer, in particular a generator for a wind turbine is provided, wherein the stator arrangement comprises a base structure; a coil holder; a coil mounted at the coil holder; and a flexible element connecting the base structure to the coil holder flexibly relative to each other. The stator arrangement may be adapted to be either used for an axial magnetic flux electromechanical transducer or for a radial magnetic flux electromechanical transducer. The base structure may comprise a frame or a casing and may function as a support structure or holder for the entire stator arrangement. The coil holder may comprise a coil support structure having a shape such that a coil may be imposed and/or supported. In particular, the coil support structure may have a stem-like shape, such as a cylinder shape, or a cuboid shape or the like over which a coil may fit.

The coil may be made of a wire comprising a conductive material, such as copper, as a core and further comprising an insulation layer coated over the conductive material. The coil may be formed by one or more windings of the wire, wherein the wound wire forming the coil may have a ring-like or annular shape having an inner surface of the ring-shaped coil which smoothly fits to an outer surface of the coil support structure. The coil may be fixed at the coil holder by using for example an adhesive or other fixing means.

The flexible element may be fixed at the base structure at a first region of the flexible element and may be fixed at the coil holder at a second region of the flexible element which may be spaced apart from the first region. The coil holder may be capable of moving relative to the base structure due to the flexible connection with the base structure using the flexible element. An amount of possible movements or displacements of the coil holder relative to the base structure may depend on a distance between the first region of the flexible element and the second region of the flexible element. The flexible element may comprise flexible material which may be deformable. In particular, the flexible element may be deformable to such a degree that its extent or dimension in one direction is changed by up to 100%, up to 70%, up to 50%, up to 10%. In particular, the degree of flexibility may depend on the particular desired application.

According to an embodiment the flexible element may further comprise an elastic material or may be shaped such that it exhibits some elasticity. In this embodiment a deflection of the coil holder relative to the base structure may result in a restoring force generated by the flexible element and exerting on the coil holder to restore its position to its original position before the deflection took place. Further, according to an embodiment the flexible element may exhibit damping property or may comprise damping material for damping oscillations. In other embodiments the flexible element may not comprise an elastic material or may not exhibit elasticity.

The stator arrangement may be used, according to an embodiment, in an electromechanical transducer whereupon problems arising from the deflection of a rotor arrangement of the electromechanical transducer may be reduced due to the possibility for the coil holder and thus the coil to undergo deflection itself in response to a deflection of the rotor arrangement, in particular the magnets comprised in the rotor arrangement.

According to an embodiment the flexible element is configured to allow movement of the coil holder relative to the base structure in a first direction. In particular, the flexible element may be confined to allow movement of the coil holder relative to the base structure only in the first direction. For example, when used in an axial magnetic flux generator it may be advantageous to provide a flexible element configured to allow movement of the coil holder relative to the base structure in the axial direction, in particular only in the axial direction. In an axial magnetic flux generator in particular deflections of the rotor arrangement may primarily occur in the axial direction which may advantageously be compensated by corresponding deflections of the coil holder and thus the coil(s) in response to the axial deflections of the rotor arrangement. Thereby, a gap between the coil(s) of the stator arrangement and magnets of the rotor arrangement may be at least approximately held constant during operation, thereby improving the performance and efficiency of the generator.

According to an embodiment the flexible element is configured to allowing movement of the coil holder relative to the base structure in a second direction different from the first direction. In particular, the second direction may be perpendicular to the first direction. According to an embodiment the stator arrangement may be utilized in a radial magnetic flux generator in which case the flexible element may be configured to allow movement of the coil holder relative to the base structure in the radial direction being perpendicular to the axial direction of the rotor arrangement of the generator. According to a further embodiment the stator arrangement may be utilized in a axial magnetic flux generator in which case the flexible element may be configured to allow movement of the coil holder relative to the base structure in the radial direction being perpendicular to the axial direction of the rotor arrangement of the generator, thereby providing the stator the opportunity to respond to deflections of the rotor arrangement in the radial direction.

According to an embodiment the flexible element may be configured to allow movement of the coil holder relative to the base structure in the first direction as well as also in the second direction different from the first direction, in particular perpendicular to the first direction. Thereby, possible deflections of the rotor arrangement or parts of the rotor arrangement in different directions may be compensated by corresponding deflections of the coil holder and thus the coil or coils, to in particular maintain a gap size between the coils and the magnets during operation.

According to an embodiment the flexible element comprises a spring. In particular, the spring may be made from a metal which is wound in a spiral-like shape imparting flexibility to the flexible element. According to another embodiment the flexible element may comprise rubber or the like exhibiting flexibility, i.e. the possibility of deforming, and on the other hand exhibiting some elasticity, i.e. generating a restoring force upon deformation from an initial shape.

According to an embodiment the stator arrangement further comprises a further coil mounted at the coil holder. In particular, the further coil may be spaced apart from the coil. The distance between the coil and the further coil may allow to arrange one or more magnets comprised in a rotor arrangement of a generator in between. Thereby, the magnets may be opposite to the coil and the further coil. According to other embodiments the magnets of the rotor arrangement may be arranged at opposite sides of the coil holder such that the coil and the further coil are both arranged between the two magnets of the rotor arrangement. When the stator arrangement is used in an axial magnetic flux generator the further coil may be spaced apart from the coil in the axial direction of the rotor arrangement. Providing a further coil mounted at the coil holder may simplify the construction of the stator arrangement and may also reduce the costs. Further, the efficiency of an electromechanical transducer utilizing the stator arrangement may be improved.

According to an embodiment the stator arrangement further comprises an additional coil holder having an additional coil and a further additional coil both mounted at the additional coil holder and a flexible coil holder connecting element flexibly connecting the coil holder and the additional coil holder relative to each other. Thereby, a stacked arrangement of the coil holder having the coil and the further coil mounted thereon and the additional coil holder having the additional coil and the further additional coil mounted thereon may be provided which may advantageously be used in a transducer allowing to improve its capacity. In particular, such a transducer, in particular an axial magnetic flux generator, may comprise a single rotor arrangement rotating around a single rotation axis relative to the stator arrangement. Thereby, the construction of the electromechanical transducer may be simplified.

Above embodiments of the present invention have been described in relation to a stator arrangement. However, it is understood that the features of the stator arrangement may also be applied to a transducer, in particular a generator, described below according to embodiments.

According to an embodiment, an electromechanical transducer, in particular a generator for a wind turbine is provided, wherein the electromechanical transducer comprises a stator arrangement according to an embodiment as described above and a rotor arrangement rotatable relative to the base structure around an axial direction. Advantages of this provision have been set forth in the context of the description of the above embodiments of a stator arrangement.

According to an embodiment the rotor arrangement comprises a magnet element operable as a magnet, wherein the magnet element is mounted at the rotor opposite to the coil. The magnet element may comprise an electromagnet and/or a permanent magnet or may be a combination of an electromagnet and a permanent magnet. In particular, one or more permanent magnets having a line running through their magnetic poles oriented at least approximately parallel to the axial direction may be utilized in an axial magnetic flux generator. Thereby, in particular, pairs of magnet elements may be provided mounted at a common support structure such that the pair of magnets is either arranged between a pair of coils of the stator arrangement or is arranged on two opposing outer sides of two coils of the stator arrangement.

According to an embodiment the coil is spaced apart from the magnet element in the axial direction. Thereby, an axial magnetic flux generator may be provided that may substantially eliminate or at least reduce traditional cogging issues observed in radial magnetic flux generators. In particular, the stator arrangement may follow any deflection of the rotor arrangement in the axial direction thereby maintaining a constant air gap size between magnet elements and corresponding coils. That the stator arrangement and thus the coils follow any deflection of the rotor arrangement may be due to the flexible element connecting the base structure to the coil holder flexibly relative to each other. In particular, the flexible element may allow sufficient freedom of movement or displacement for the stator arrangement primarily in the axial direction. In other embodiments the flexible element may allow movement of the coil holder and thus the coils in another direction or in plural other directions, such as the radial direction.

According to an embodiment the electromechanical transducer further comprises a rotor sliding surface arranged at the rotor arrangement and a coil holder sliding surface arranged at the coil holder, wherein the rotor sliding surface and the coil holder sliding surface are adapted to, upon rotating of the rotor, slide relative to each other such that a size of a gap between the coil and the magnet element is maintained. In particular, the gap size may be maintained during operation of the electromechanical transducer, i.e. upon rotating the rotor arrangement relative to the base. In particular, the rotor sliding surface and the coil holder sliding surface may represent guiding surfaces which may at least occasionally contact each other such that a deflection of the rotor arrangement causes exerting a force via the rotor sliding surface onto the coil holder sliding surface, whereupon the coil holder may be deflected in response to the deflection of the rotor arrangement. In particular, the rotor sliding surface and/or the coil holder sliding surface may exhibit a coating facilitating gliding relative to each other and/or may comprise a lubricant applied onto the rotor sliding surface and/or the coil holder sliding surface. Further, the rotor sliding surface and/or the coil holder sliding surface may comprise flexible material and/or elastic material. In particular, for each pair of opposing magnet and coil one or more rotor sliding surfaces and/or coil holder sliding surfaces may be provided. In particular, the rotor sliding surface may be arranged opposite to the coil holder sliding surface. By this provision the size of the gap between the coil and the magnet element may advantageously be held constant during operation, thereby improving the efficiency of the electromechanical transducer.

According to an embodiment the rotor arrangement of the electromechanical transducer comprises a protrusion extending in the axial direction, wherein the rotor sliding surface is arranged at an end of the protrusion. In particular, the coil holder and the additional coil holder together may form a yoke having a U-shape and having the coil and the further coil mounted at inner surfaces of the U-shaped structure such that the coil and the further coil are arranged opposite to each other. Further, according to this embodiment the rotor sliding surface at the end of the protrusion may be opposite to one of the inner surfaces of the U-shaped structure and a further rotor sliding surface arranged at an end of a further protrusion extending in the axial direction may be opposite to the other inner surface of the U-shaped structure of the stator arrangement. In other embodiments the rotor sliding surface arranged at the end of the protrusion may be opposite to an outer surface of the stator arrangement which may harbour one or more coils facing outwards.

According to an embodiment the rotor sliding surface is spaced apart from the magnet element in a radial direction perpendicular to the axial direction. Thereby the rotor sliding surface may not contact the coil being opposite to the magnet element but may occasionally contact a surface of the stator arrangement spaced apart from the coil. Thereby, it may be ensured that the magnet element is not damaged during operation, as the magnet element may not contribute to guiding the stator arrangement in response to deflections of the rotor arrangement.

According to an embodiment the coil holder sliding surface is spaced apart from the coil in a radial direction. Thereby, it may be prevented that the coil is damaged during operation, since the coil may not contribute to guiding the stator arrangement in response to deflections of the rotor arrangement. Thereby, a durability of the electromechanical transducer may be improved.

According to an embodiment the rotor sliding surface and/or the coil holder sliding surface of the electromechanical transducer comprises a flexible material. The flexible material may comprise rubber or a filling material, such as a foam or mouldable plastic. Thereby, the sliding and guiding properties may be adapted as desired. Further, lubricant may be applied to the rotor sliding surface and/or the coil holder sliding surface.

According to an embodiment a wind turbine is provided comprising an electromechanical transducer according to one of the embodiments described above. Thereby, the electromechanical transducer may be used as a generator, wherein the rotor arrangement is mechanically coupled to a propeller of the wind turbine which may comprise one or more wind blades.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present, invention will now be described by reference to the accompanying drawings. In the drawings, components or elements similar in structure and/or function are denoted by similar reference signs.

DETAILED DESCRIPTION

Figure 1:
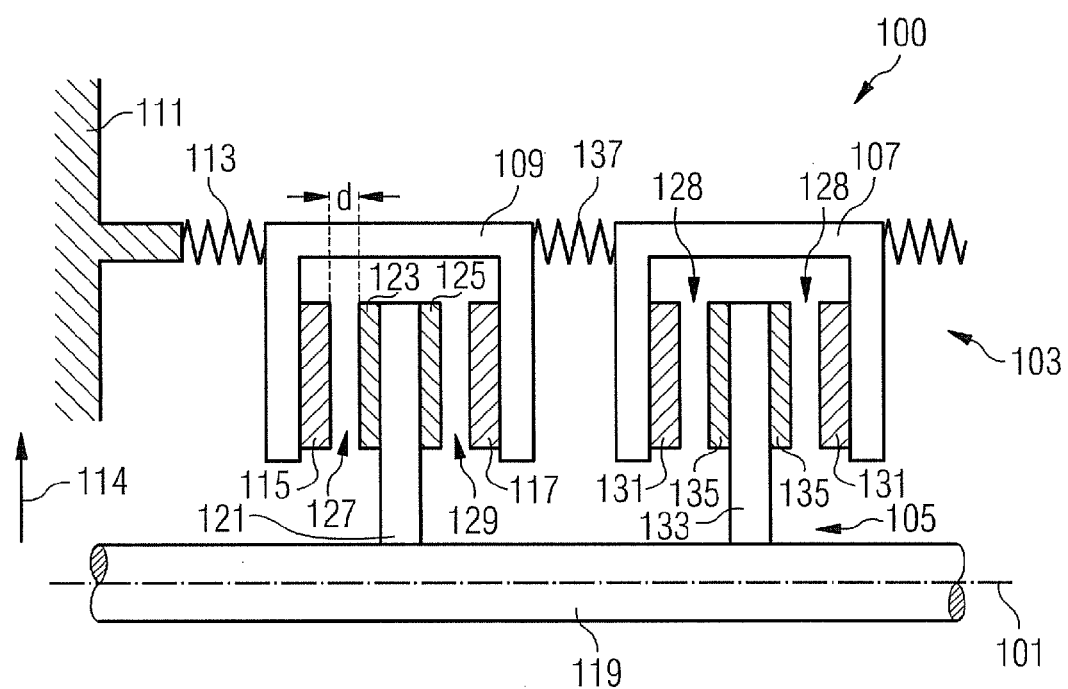
FIG. 1 schematically shows a cross-sectional view of a part of an electromechanical transducer according to an embodiment.

The illustration in the drawing is schematically. It is noted that in different figures, similar or identical elements are provided with the same reference signs or with reference signs, which are different from the corresponding reference signs only within the first digit.

FIG. 1 schematically illustrates a part of generator 100 in a cross-sectional view representing a cross-section in a plane including the rotation axis 101. The generator 100 comprises a stator arrangement 103 and a rotor arrangement 105.

The stator arrangement 103 comprises a coil holder 107 having a U-shape in cross-section and a coil holder 109 also having a U-shape in cross-section. In other words, the coil holders 107 and 109 may represent two yokes.

The stator arrangement further comprises a base structure 111. The coil holder 109 is connected to the base structure 111 by means of a flexible element 113 connecting the base structure to the coil holder flexibly relative to each other. In the illustrated embodiment the flexible element is implemented as a spring 113 which provides flexibility and also elasticity. Thus, the coil holder 109 may move relative to the base 111 at least in a direction parallel to the rotation axis 101, but also in a direction perpendicular, or at least transverse to the direction of the rotation axis 101.

At the coil holder 109 a coil 115 is mounted at a first inner surface of the U-shaped coil holder and another coil 117 is mounted at another inner surface of the U-shaped coil holder. Thereby, the two coils 115 and 117 are arranged opposite to each other. The coils 115 and 117 may comprise a wound wire each.

A rotation shaft 119 rotatable around the rotation axis 101 relative to the base 111 comprises a magnet support structure 121 at which a first magnet 123 and a second magnet 125 are mounted. Thereby, the magnet 123 is arranged opposite to the coil 115, wherein a gap 127 having a gap size d is formed. Analogously a gap 129 is formed between the magnet 125 and the opposing coil 117.

The coil holder 107 is constructed in analogy to the coil holder 109 and thus has two coils 131 mounted at inner surfaces of the U-shaped coil holder 107. A further magnet support structure 133 is mounted at the rotation shaft 119 and protrudes radially outwards. At a radially outer portion of the magnet support structure 133 two magnets 135 are mounted at opposing surfaces of the magnet support structure 133. Thereby, the coils 131 are arranged opposite to the magnets 135.

Upon rotation of the rotation shaft 119 around the rotation axis 101 the magnet 123 moves in a circumferential direction perpendicular to the radial direction (oriented vertically in FIG. 1) and perpendicular to the axial direction (oriented horizontally in FIG. 1). Thereby, a magnetic flux penetrating the coil 115 changes, whereupon a voltage is induced between different points within the wire forming the coil 115. Thereby, the mechanical energy associated with the rotation of the rotation shaft 119 is converted into electrical energy.

Due to misalignments of the rotation axis 101 relative to the base 111 and also relative to the coil holder 109 and coil holder 107 the size d of the gap between the coil 115 and the magnet 123 may vary upon rotating the rotor arrangement 105. Thereby, the efficiency of the generator 100 may be hampered.

Therefore according to an embodiment, in response to a deflection of the rotor arrangement 105 relative to the coil holders 109 and 107 the coil holder 109 may correspondingly move due to the flexible connection to the base 111 via the flexible element 113. Thereby, the gap size d may be kept constant.

The coil holder 107 is connected to the coil holder 109 via the flexible element 137 which allows also the coil holder 107 to be shifted in position the coil holder 109 and also relative to the base 111, in particular in the axial direction 101, in response to a deflection of the rotor arrangement 105, and in particular the magnets 135 comprised in the rotor arrangement 105.

Figure 2:
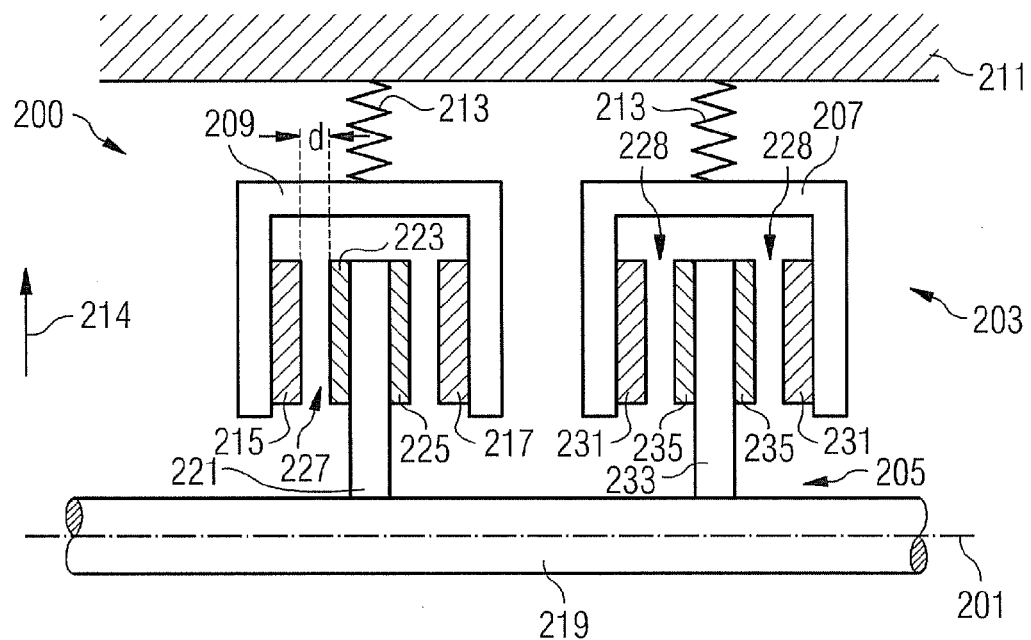
FIG. 2 schematically illustrates a cross-sectional view of a part of an electromechanical transducer according to another embodiment.

FIG. 2 schematically illustrates a portion of a generator 200 in a cross-sectional view according to an embodiment. The generator 200 comprises many components which are similar to the generator 100 illustrated in FIG. 1 so that the corresponding elements are not described in detail, since the description of these corresponding features and elements may be taken from the description referring to FIG. 1. A difference between the generator 200 illustrated in FIG. 2 and the generator 100 illustrated in FIG. 1 is that the coil holders 209 and 207 are each connected by a flexible element 213 to the base 211. In particular the flexible element 213 extends in a radial direction 214 perpendicularly to the rotation axis 201 of the rotation shaft 219. Thereby, the flexible elements 213 may allow movements of the coil holders 209 and 207 relative to the base 211 at least in the radial direction 214 and may also provide elasticity in this direction. In the embodiment illustrated in FIG. 2 the flexible elements 213 are implemented as springs, but may be implemented by other components, such as dampers comprising rubber and/or foam.

Differing from the generator 100 illustrated in FIG. 1 the generator 200 illustrated in FIG. 2 does not comprise a flexible element connecting the adjacent coil holders 209 and 207. Thereby, they may deflect or move relative to the base 211 independently from each other. This may in particular be advantageous, if the magnet support elements 221 and 233 have different degrees of misalignments and thus do not deflect in the same way or to a same amount during operation of the generator 200. In particular, upon rotation of the rotor arrangement 205 the magnet support element 221 (or a neighbouring magnet support element circumferentially spaced apart from the support element 221 arranged in a same axial position as the magnet support element 221) may deflect by a different amount than the magnet support element 233 (or a neighbouring magnet support element circumferentially spaced apart from the support element 223 arranged in a same axial position as the magnet support element 223) requiring a different corresponding deflection or movement of the coil holder 209 and the coil holder 207 in order to maintain a size of the gap 227 or 228, respectively.

In other embodiments there may, additionally to the flexible elements 213 connecting the coil holders 209 and 207 to the base 211, a further flexible element be provided which connects the coil holder 209 with the coil holder 207 flexibly relative to each other. Thereby, deflection or movement of one coil holder 209 or 207 may cause a movement of the respective other coil holder 207 or 209 in an at least partially coupled way.

Figure 3:
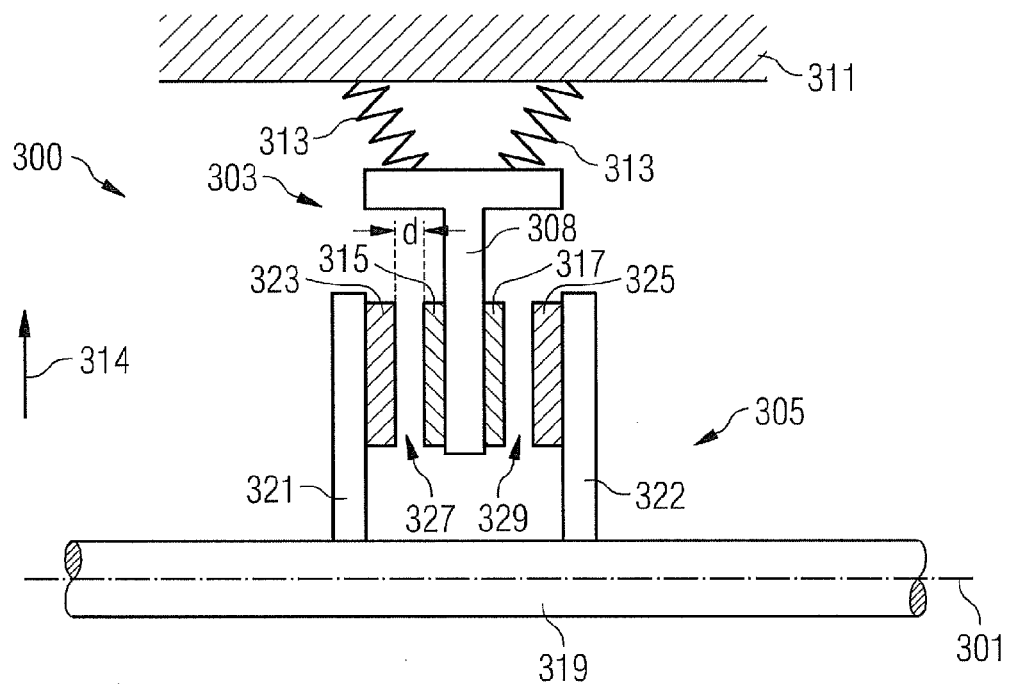
FIG. 3 schematically illustrates a cross-sectional view of a part of an electromechanical transducer according to a still further embodiment.

FIG. 3 schematically illustrates a portion of a generator 300 in a cross-sectional view according to an embodiment. In contrast to the embodiments illustrated in FIG. 1 and FIG. 2 the generator 300 comprises magnet support elements 321 and 322 each carrying one magnet 323, 325, respectively instead of having only one magnet support element 121 carrying two magnets 123 and 125 as the embodiment illustrated in FIG. 1.

In between the separate magnet support elements 321 and 322, and thus in between the magnets 323 and 325 a coil holder 308 is arranged on which two coils 315 and 317 are mounted on opposite surfaces thereof. In particular, the coil holder 308 does not exhibit a U-shape as the coil holder 109 illustrated in FIG. 1, but may have a stem-like shape suitable for carrying two coils at opposite surfaces. The coil holder 308 is flexibly connected relative to the base 311 by flexible elements 313 which extend in two different directions each being in between the axial direction 301 and the radial direction 314. These flexible elements 313 allow movement of the coil holder 308 relative to the base in the axial direction as well as in the radial direction and provide at the same time elasticity. Thereby, a gap size d of a gap 327 between the magnet 323 and the coil 315 may be maintained constant upon rotation of the magnet 323 relative to the coil 315.

Figure 4:
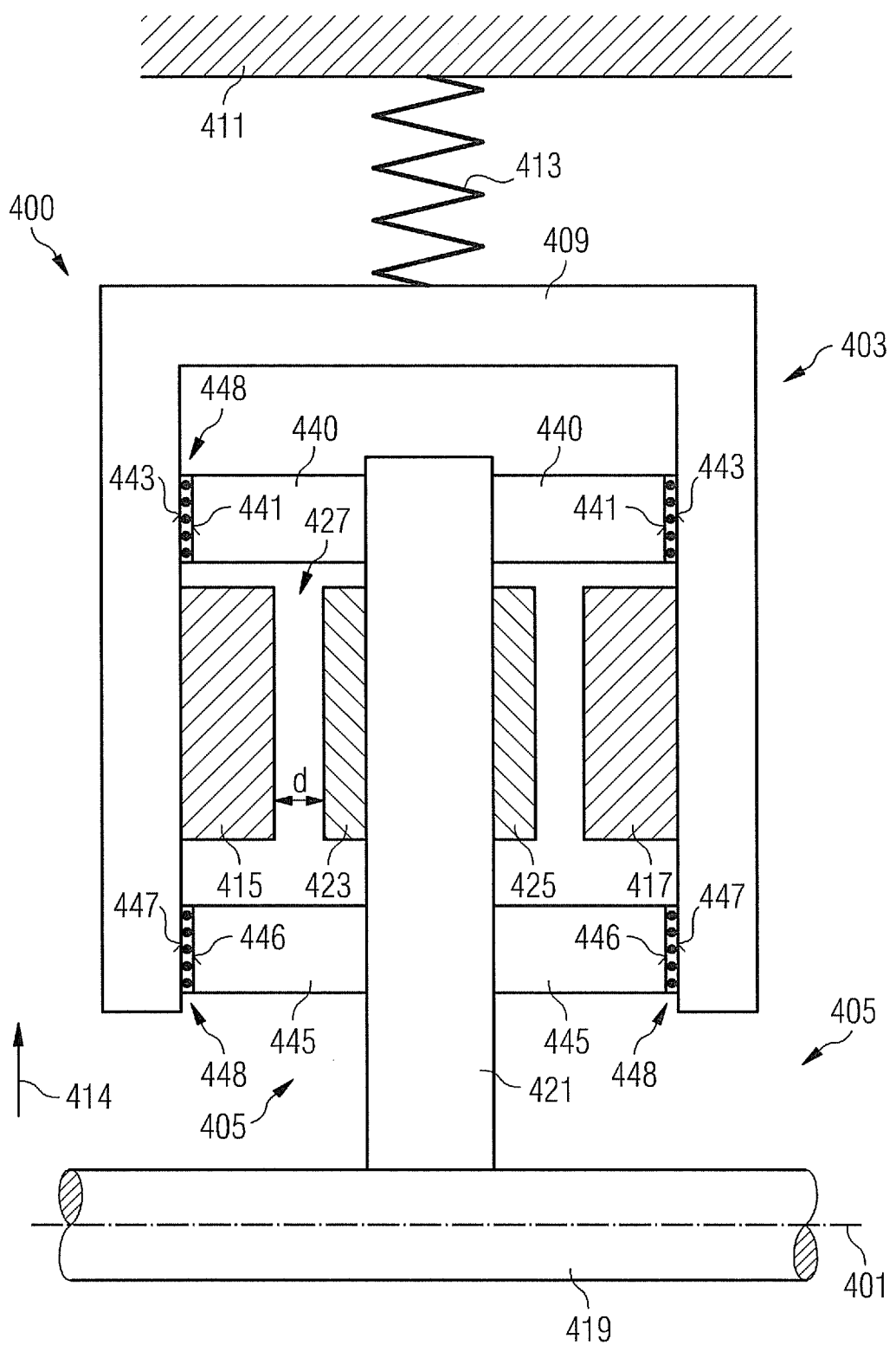
FIG. 4 schematically illustrates a cross-sectional view of a part of an electromechanical transducer according to a still further embodiment.

FIG. 4 schematically illustrates a portion of a generator 400 in a cross-sectional view according to an embodiment. The embodiment 400 illustrated in FIG. 4 has a number of similarities to the embodiments illustrated in FIG. 1, FIG. 2 or FIG. 3. In particular, the coil holder 409 has a U-shape and carries a coil 415 at a first inner surface and carries a coil 417 at a second inner surface opposite to the first inner surface. The rotor arrangement 405 comprises a rotation shaft 419 rotatable around a rotation axis 401 and comprising a magnet support element 421 extending radially outwards. The magnet support element 421 carries or supports a magnet 423 being arranged opposite to the coil 415 and further carries a magnet 425 arranged opposite to the coil 417.

Further, the rotor arrangement 405 comprises a protrusion 440 connected to the magnet support element 421 and extending in the axial direction 401. At axial ends of the protrusion 440 rotor sliding surfaces 441 are arranged which are opposite and close to coil holder sliding surfaces 443. These surfaces 441 and 443 may slide along each other when the rotor arrangement 405 rotates relative to the coil holder 409 around the rotation axis 401. Thereby, the rotor sliding surface 441 and the coil holder sliding surface 443 may occasionally contact each other, when the rotor arrangement 405 or the magnet support element 421 (or a circumferentially neighbouring magnet support element arranged at a same axial position as the magnet support element 421) deflect (in particular change their axial position) during operation from their ideal position between opposing inner surfaces of the U-shaped coil holder 409. Thereby, the surface 441 of the protrusion 440 may exert a force acting in the axial direction onto the coil holder sliding surface 443 causing the coil holder 409 to deflect in response to a deflection of the protrusion 440 and thus in response to a deflection of the magnet support element 421 (or a circumferentially neighbouring magnet support element arranged at a same axial position as the magnet support element 421). This movement of the coil holder 409 in response to a reflection or movement of the protrusion 440 in the axial direction is enabled by the flexible connection of the coil holder 409 to the base using the flexible element 413.

In a region radially closer to the rotation axis 401 the rotor arrangement 405 comprises a further protrusion 445 also being mounted at the magnet support element 421 and extending in the axial direction 401. At axial outer ends of the protrusion 445 further rotor sliding surfaces 446 are arranged which are opposite and close to coil holder sliding surfaces 447. The sliding surfaces 446 and 447 may slide relative to each other and may contact each other occasionally during operation such that movement of the coil holder 409 may be guided.

Between the sliding surfaces 441 and 443 and between the sliding surfaces 446 and 447 a lubricant 448 may be applied in order to facilitate sliding of the opposing sliding surfaces relative to each other. Other embodiments may provide a filler material between sliding surfaces. Other embodiments may provide fewer or more opposing sliding surfaces to even improve guiding the movement of the coil holder 409 in response to a movement of the magnet support element 421 and/or the rotor arrangement 405.

It is to be understood that the generator 400 illustrated in FIG. 4 may comprise further coil holders and magnet support holders with respective coils and magnets mounted which may be spaced apart from each other in the axial direction in analogy to the embodiments illustrated in FIGS. 1 and 2. Further, the coil holders arranged spaced apart in the axial direction may or may not be connected to each other by flexible elements (in an embodiment also providing elasticity) in analogy to the embodiment illustrated in FIG. 1.

Further, in analogy to the embodiment illustrated in FIG. 4 the generator 300 illustrated in FIG. 3 may also comprise protrusions either connected to the coil holder 308 or to the magnet support elements 321 and/or 322, wherein these protrusions may provide sliding surfaces which may be arranged opposite to sliding surfaces of the magnet support elements 321, 322 or the coil holder 308.

Further, between a coil and a magnet in any of the above-described embodiments a flexible material, a filling material or the like may be arranged to provide further guiding of the coil holder by the magnet support element.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A stator arrangement for an electromechanical transducer, comprising:
   a base structure;
   a coil holder having a U-shaped cross-section;
   a coil mounted within the U-shaped coil holder;
   a flexible element connecting the base structure to the U-shaped coil holder flexibly relative to each other,
   a further coil mounted within the U-shaped coil holder,
   an additional coil holder having a U-shaped cross-section, having an additional coil, and a further additional coil both mounted within the additional U-shaped coil holder;
   wherein the coil and the further coil are mounted on the inner surfaces of the U-shaped coil holder facing each other with a gap for a rotor arrangement axially between the coil and further coil, and
   wherein the additional coil and the further additional coil are mounted on the inner surfaces of the U-shaped additional coil holder facing each other with a gap for the rotor arrangement axially between the additional coil and further additional coil, and a flexible coil holder connecting element flexibly connecting the U-shaped coil holder and the additional U-shaped coil holder to allow movement relative to each other,
wherein the flexible element enables the U-shaped coil holders to move in an axial direction.

2. The stator arrangement according to claim 1, wherein the flexible element is configured to allow movement of the U-shaped coil holder relative to the base structure in an axial direction.

3. The stator arrangement according to claim 1, wherein the flexible element is configured to allow movement of the U-shaped coil holder relative to the base structure in a radial direction.

4. The stator arrangement according to claim 1, wherein the flexible element comprises a spring.

5. An electromechanical transducer, comprising:
a stator arrangement, comprising:
a base structure;
a coil holder having a U-shaped cross-section;
a coil mounted within the U-shaped coil holder;
a flexible element connecting the base structure to the U-shaped coil holder flexibly relative to each other;
a further coil mounted within the U-shaped coil holder,
an additional coil holder having a U-shaped cross-section, having an additional coil, and a further additional coil both mounted within the additional U-shaped coil holder;
wherein the coil and the further coil are mounted on the inner surfaces of the U-shaped coil holder facing each other with a gap for a rotor arrangement axially between the coil and further coil, and
wherein the additional coil and the further additional coil are mounted on the inner surfaces of the U-shaped additional coil holder facing each other with a gap for the rotor arrangement axially between the additional coil and further additional coil, and
a flexible coil holder connecting element flexibly connecting the U-shaped coil holder and the additional U-shaped coil holder to allow movement relative to each other; and
the rotor arrangement rotatable relative to the base structure around an axial direction,
wherein the rotor arrangement includes a rotation shaft which rotates around the axial direction, and
wherein in response to sliding of the rotor arrangement along the axial direction, the flexible element enables the U-shaped coil holders to move in the axial direction.

6. The electromechanical transducer according to claim 5, wherein the rotor arrangement comprises a magnet element operable as a magnet, the magnet element being mounted at the rotor arrangement opposite to the coil.

7. The electromechanical transducer according to claim 6 wherein the coil is spaced apart from the magnet element in the axial direction.

8. The electromechanical transducer according to claim 6, further comprising:
a rotor sliding surface arranged at the rotor arrangement; and
a coil holder sliding surface arranged at the U-shaped coil holder,
wherein the rotor sliding surface and coil holder sliding surface are adapted to, upon rotating of the rotor arrangement, slide relative to each other such that a size of a gap between the coil and the magnet element is maintained.

9. The electromechanical transducer according to claim 8, wherein the rotor arrangement comprises a protrusion extending in the axial direction, wherein the rotor sliding surface is arranged at an end of the protrusion.

10. The electromechanical transducer according to claim 8, wherein the rotor sliding surface is spaced apart from the magnet element in a radial direction perpendicular to the axial direction.

11. The electromechanical transducer according to claim 8, wherein the coil holder sliding surface is spaced apart from the coil in a radial direction.

12. The electromechanical transducer according to claim 8, wherein at least one of the rotor sliding surface and the coil holder sliding surface comprises a flexible material.

13. The electromechanical transducer according to claim 5, wherein the electromechanical transducer is a generator.

14. A wind turbine, comprising:
a generator, comprising:
a stator arrangement, comprising:
a base structure;
a U-shaped coil holder;
a coil mounted within the U-shaped coil holder;
a flexible element connecting the base structure to the U-shaped coil holder flexibly relative to each other;
a further coil mounted within the U-shaped coil holder,
an additional U-shaped coil holder having an additional coil and a further additional coil both mounted within the additional U-shaped coil holder;
wherein the coil and the further coil are mounted on the inner surfaces of the U-shaped coil holder facing each other with a gap for a rotor arrangement axially between the coil and further coil, and
wherein the additional coil and the further additional coil are mounted on the inner surfaces of the U-shaped additional coil holder facing each other with a gap for the rotor arrangement axially between the additional coil and further additional coil, and
a flexible coil holder connecting element flexibly connecting the U-shaped coil holder and the additional U-shaped coil holder to allow movement relative to each other; and
the rotor arrangement rotatable relative to the base structure around an axial direction,
wherein the rotor arrangement includes a rotation shaft which rotates around the axial direction, and
wherein in response to sliding of the rotor arrangement along the axial direction the flexible element enables the U-shaped coil holders to move in the axial direction.

* * * * *